(12) United States Patent
Munshi (10) Patent No.: US 6,426,861 B1
(45) Date of Patent: Jul. 30, 2002

(54) HIGH ENERGY DENSITY METALLIZED FILM CAPACITORS AND METHODS OF MANUFACTURE THEREOF

(75) Inventor: M. Zafar A. Munshi, Missouri City, TX (US)

(73) Assignee: Lithium Power Technologies, Inc., Manvel, TX (US)

( * ) Notice: Subject to any disclaimer, the term of this patent is extended or adjusted under 35 U.S.C. 154(b) by 0 days.

(21) Appl. No.: 09/337,224

(22) Filed: Jun. 22, 1999

(51) Int. Cl.$^7$ .............................. H01G 4/20; H01G 4/08; H01G 7/00
(52) U.S. Cl. ..................... 361/312; 361/323; 29/25.42
(58) Field of Search ........................... 361/301.2, 301.5, 361/311, 312, 313, 314, 316–319, 323; 525/199, 240; 29/25.42

(56) References Cited

U.S. PATENT DOCUMENTS

| | | | | |
|---|---|---|---|---|
| 3,955,012 A | * | 5/1976 | Okamura et al. | 427/2.24 |
| 4,049,859 A | * | 9/1977 | Yoshikawa et al. | 428/172 |
| 4,131,931 A | * | 12/1978 | Nishikawa et al. | 524/433 |
| 4,434,209 A | * | 2/1984 | Sasaki et al. | 428/416 |
| 4,521,826 A | * | 6/1985 | Shedigian et al. | 361/314 |
| 5,089,347 A | * | 2/1992 | Hart | 428/461 |
| 5,149,918 A | * | 9/1992 | Kozik et al. | 178/18.05 |
| 5,416,155 A | * | 5/1995 | Aladenize et al. | 524/495 |

* cited by examiner

Primary Examiner—Dean A. Reichard
Assistant Examiner—Eric W. Thomas (57) ABSTRACT

A film capacitor includes a novel hybrid polymeric film dielectric in which at least one non-polar dielectric homopolymer resin is blended homogeneously in solid-solution with at least one other dielectric polymer resin. The properties of at least one of the dielectric polymer resin constituents of the hybrid polymeric film dielectric are selected to produce a tailored property or properties of the solid-solution blend thereof. The non-polar homopolymer serves to stabilize the hybrid polymeric film. In the film capacitor configuration, the hybrid polymeric film is tightly sandwiched between conformable metal plates.

56 Claims, 2 Drawing Sheets

HIGH ENERGY DENSITY METALLIZED FILM CAPACITORS AND METHODS OF MANUFACTURE THEREOF

BACKGROUND OF THE INVENTION

The present invention relates generally to metallized plastic film capacitors, and more particularly to structure and method of manufacture of such capacitors utilizing plastic film with increased dielectric constant, and dielectric strength, improved stability, and low dissipation factor compared to metallized film capacitors of the prior art.

A brief treatment of capacitors will be advantageous to an understanding of the invention. In general, a capacitor consists of two conducting metal plates separated by high quality uniform insulating media (dielectric) capable of storing electrical energy at field stress levels approaching the ultimate voltage withstand value, or breakdown voltage value, of the media material. The static capacitance, C, of the device is related to the applied voltage as follows:

$$C=Q/V \qquad (1)$$

where the capacitance of the capacitor measured in units of farads (F) is equal to the quantity of charge Q in coulombs which is stored on the positively charged metallic plate of the capacitor, divided by the total potential difference V in volts across the plates. Geometrically:

$$C=ee_oA/t \qquad (2)$$

where A is the area of each plate, t is the thickness of the insulating media layer of dielectric constant e, and $e_o$ is the dielectric constant of free space. The energy, E, in joules (J) stored in the capacitor at a potential difference V across the plates is:

$$E=\frac{1}{2}C(V)^2 \qquad (3)$$

The energy stored in a charged capacitor can be continuously increased in proportion to the increase of the voltage, up to high values of V, limited only by the electrical breakdown of the dielectric. It would appear, then, that the most significant increases in the energy density of a capacitor may be made either by increasing the dielectric constant e of the insulating media, or by increasing the applied voltage (field stress) V, or both. The solution, however, is not that simple. In some cases, an increase in the dielectric constant will lead to an increase in dielectric losses, leading to thermal management problems and, worst case, to thermal failure of the capacitor. And an increase in the applied field stress can lead to low reliability and early failure from several possible failure mechanisms which include electromechanical, thermal, chemical and partial discharge mechanisms, to name a few.

A typical conventional metallized film capacitor is the wound capacitor. Dielectric material used in this and other film-type capacitor designs include Kraft paper and various polymer films such as polyester, polypropylene and polycarbonate. The capacitor is formed by sandwiching the dielectric film between metal electrodes (the capacitor plates, which may, for example, be discrete foils or vapor deposited metal film). Use of metallized film reduces capacitor size, but at the expense of peak and average power capability. Connections are made to the electrodes either by extending one entire edge of an electrode out one end of the winding and soldering, arc, flame-spraying or silver-epoxying connections at each end, or by inserting wires or flattened tabs into the winding in contact with each electrode. Examples of wound capacitors are disclosed in U.S. Pat. Nos. 4,719,539 and 4,685,026 to Lavene, U.S. Pat. No. 5,384,684 to Sugisawa, and U.S. Pat. No. 5,406,446 to Peters.

Plastic film capacitors have been the capacitor of choice for many power electronics and pulse power applications because of their inherent low losses, excellent high frequency response, low dissipation factor (DF), low equivalent series resistance (ESR) and high voltage capabilities. Film capacitors have no capacitance coefficient with applied voltage, and metallic migration or leaching does not occur as observed in ceramic capacitors. The film molecule is stable over long term use and is not prone to dielectric dissipation factor degradation or metallic shorting mechanism. Table 1 shows typical properties of some of the common film dielectrics in use today.

TABLE I

Typical properties of some common types of capacitors.

| Capacitor Types | K | Voltge Brkdn (V/ml) | DF (%) | Insulation Resistance @ 25° C. (Ohms) | Max Oper. Temp (° C.) | Enrg Dens (J/cc) |
|---|---|---|---|---|---|---|
| Plastic Film | | | | | | |
| Polycarbonate (PC) | 2.8 | 13,400 | <1 | $2\times10^{11}$ | 125 | 0.5–1 |
| Polypropylene (PP) | 2.2 | 16,250 | <0.1 | $8\times10^{11}$ | 105 | 1–1.5 |
| Polyester (PET) | 3.3 | 14,500 | <1.5 | $5\times10^{10}$ | 125 | 1–1.5 |
| Polyvinylidene-fluoride (PVDF) | 12 | 15,000 | 1–5 | $1\times10^{9}$ | 125 | 2.4 |
| Polyethylene-napthlate (PEN) | 3.2 | 14,000 | <1 | $5\times10^{10}$ | 125 | 1–1.5 |
| Polyphenylene-sulfide (PPS) | 3.0 | 14,000 | <0.2 | $5\times10^{10}$ | 200 | 1–1.5 |
| Teflon ™ (PTFE) | 2.1 | 7,000 | <1 | $5\times10^{10}$ | 200 | 0.5–1 |

Polyethylene terephthalate (polyester or PET) offers a reasonable dielectric constant, has a higher operating temperature of 125° C., and is available in film thickness of less than one micron ($\mu$m). However, PET has relatively higher DF with increasing temperature and frequency. For high repetition rate, PET is unsuitable for high pulse power applications.

Polypropylene (PP) has inherently low losses, excellent frequency response and very low DF and ESR with temperature and frequency. In fact, the material possesses a negative temperature coefficient of dissipation factor. The PP chain molecules do not possess polar groups, which are oriented under the effect of electric fields. It is this phenomenon which gives rise to the above beneficial properties. It has the highest breakdown voltage of any capacitor film material. Its only negative may be its maximum operating temperature of 105° C.

Devices made with polyethylene napthalate (PEN), polycarbonate (PC) and polyphenylene sulfide (PPS) dielectrics also have extremely stable characteristics over extremes of voltage, temperature and frequency. Although the intrinsic breakdown voltage for most of these film dielectrics is quite high, in full wound capacitors these dielectrics are usually derated by a factor of 6 to 8 for improved cycle life and reliability.

The polar polymer polyvinylidene fluoride (PVDF) exhibits a large dielectric constant (~12) and demonstrates excellent piezoelectric and pyroelectric properties. PVDF is a partially crystalline linear polymer with a carbon backbone in which each monomer $\{CH_2—CF_2—\}$ unit has two dipole moments, one associated with $CF_2$ and the other with $CH_2$. In the crystalline phase, PVDF exhibits a variety of molecular conformations and crystal structures depending on the method of preparation. The extruded or cast material usually contains 40 and 60% crystalline material in one or both of the principal crystalline phases, alpha and beta. The alpha phase predominates in material cast from the melt. This phase is converted to the beta phase by mechanical deformation of the material at temperatures less than 100° C. In commercial production, PVDF film is extruded and mechanically stretched both parallel and perpendicular to the direction of extrusion, as are most of the capacitor grade film dielectrics. This causes a preferred orientation of the polymer chains in the plane of the film and also converts a large percentage of crystallites to beta form. It is this bi-axially oriented film material which, after polarization, forms the basis of piezoelectric and pyroelectric devices. Unfortunately, the highly crystalline structure also results in some weakness in the physical strength of the film. This causes major problems during the manufacture of very thin films in gauges of less than $5\mu$.

Metallized film capacitors offer the highest volumetric and gravimetric energy densities and reliability of all designs of film capacitors and offer higher pulse power capabilities than foil and other designs. Early film capacitors for high pulse power applications were of dielectric film/foil construction, impregnated with dielectric fluid that filled any voids between layers, and typically had energy densities of less than one J/cc. More recent improvements to these pulse power devices include use of metallized polymer films as the dielectric, providing higher energy density and greater reliability. Fluid impregnated film capacitors have a very narrow operating temperature range while the metallized version can operate up to 100° C. with the exception of PPS and PTFE, which can reach an operating temperature of 200° C. Plastic film capacitors can be tailored for very high voltages simply by adjusting the film or dielectric thickness in the capacitor.

The thin metallization layer on a metallized film capacitor is capable of vaporizing away if a short circuit or a weak location occurs somewhere in the dielectric. This phenomenon is known as self-healing or clearing. Clearing should only result in metal oxide insulator formation. Weak locations are usually caused by localized thin spots, or "bubbles," during film manufacture, or due to an impurity within or on the surface of the film, or due to a conductive "track" within the dielectric layer. These are adverse features that are common to all polymer film dielectric materials.

For high pulse power applications, metallized film capacitor dielectrics typically have been either PP or PVDF, the former being the preferred polymer for high repetition rate applications because of its extremely low DF, while the latter is the preferred polymer for low repetition rate applications because of its high dielectric constant (12) compared to films such as PP (2.5). To the knowledge of the applicant herein, the highest energy density attained to date using PVDF film material in high pulse power devices is about 2.4 J/cc. PVDF appeared to have promise in various applications, but suffers from non-linearity of capacitance with voltage, very poor insulation resistance, poor clearing ability, high leakage current, relatively low voltage breakdown, poor mechanical properties, and unavailability in thin gauge and uniform thickness. PVDF suffers from poorer performance at elevated temperatures, with application of voltage producing a larger number of clearing sites than at room temperature. In addition, PVDF has relatively high cost. While PP has a poor dielectric constant that limits its overall energy density, it is otherwise an excellent dielectric insulator.

In addition to high pulse power applications, a large market exists for a highly energy dense capacitor in the medical sector, such as in implantable defibrillators for treatment of ventricular fibrillation and other cardiac dysrhythmias. The energy density of currently available electrolytic capacitors for a 30 Joule (15 cc) defibrillator is about 2 J/cc. A 30 J high voltage film capacitor with energy density of at least 5 J/cc would occupy only about 40% of presently used capacitor volume, have no reform or outgassing, low ESR, and thus could allow use of a smaller battery to charge the capacitor, so as to provide a significant reduction in overall defibrillator size. The device is implanted in the patient's pectoral region, but is typically considerably larger than implantable pacemakers. The batteries and capacitors occupy approximately 70% of the total space, so reduction in size of those components would lead to significant savings in device size.

Specification of capacitors for use in implantable defibrillators presents a unique challenge because of a need for high power and energy density in a small package. Physiological uniqueness is also present because a relatively high voltage is required to achieve successful defibrillation, and the energy must be delivered in a time frame measured in milliseconds (ms). While recent studies have indicated that defibrillation in humans may be possible with relatively lower voltages and energies than have been thought to be required in the past, the high voltages presently used are essential to provide the highest confidence level of achieving a successful defibrillation.

Current major capacitor requirements for an implantable defibrillator include:

700 to 800 V/100 to 150 mF

Energy delivery of 20 to 40 J in 10–20 ms pulse

Longevity of greater than 5 years

Energy density greater than 5 J/cc

Capacitor sits in the uncharged state

Nominal leakage current of less than 100 microamperes ($\mu$A)

Operation in an isothermal (37° C.) environment

In practice, aluminum electrolytic photoflash capacitors typically are used, which exhibit an energy density of about 2 J/cc at operating voltages of about 375 V under these conditions. This capacitor maximizes the surface area of the electrode and can be fabricated in thin film configuration to optimize the energy density. But the system holds little promise of volume and weight reduction. The system is also prone to possible energy reversal, which can lead to deformation of the anodic oxide film, resulting in decreased energy storage efficiency. Despite their high capacitance and certain other advantages, the aluminum electrolytic capacitors suffer from such disadvantages as reforming periodically (with attendant consumption of valuable battery energy), physical size, high dissipation factor, low voltage (two required per defibrillator), hydrogen liberation during charge and storage (either the capacitor or the integrated circuit in the defibrillator must be hermetically sealed for protection), thermal runaway at high sustained voltage, short shelf life, and fluid outgassing.

Medical applications of capacitors beyond the implantable defibrillator include external defibrillators, microstimulators, and cochlear implants.

An appropriate solid state film capacitor could circumvent the problems encountered with the electrolytic capacitor and provide various benefits, such as no reform (with consequent conservation of battery energy), lighter weight, high energy density (possibly greater than 5 J/cc), monolithic (i.e., only one component required to provide 700 V), no outgassing, greater reliability and safety, wide operating temperature range, flexible form factor, and relatively much lower cost. Recent innovations in film material processing has led to incremental improvements of 20 to 30% in energy density and other properties of the film.

One area of improvement is described, for example, in U.S. Pat. No. 5,614,111 to Lavene, and in a publication by G. J. Walters, in 17th CARTS, Mar. 24–27, 1997, where the metallization is made as thin as possible—from 5 to 300 $\Omega$/sq as opposed to the 1 to 4 $\Omega$/sq of the typical industry metallization thickness—to increase the film's dielectric strength (voltage breakdown). Dielectric breakdown for PEN and PET using this metallization process is higher by 20 to 100%, but this is insufficiently significant to provide the energy density of 5 J/cc required by the implantable defibrillator.

Another area of improvement is in coating the polymer film dielectric with a thin film of acrylate material (e.g., 0.3 to 1 micron) before metallizing to increase breakdown voltage and energy density, and to improve clearing ability of the polymer film. This is described, for example, in PCT application publication No. WO 97/37844 to Yializis. Initial data for PET film suggests an improvement in breakdown voltage by about 10–20% on thin films (2 microns) and 30–50% on ultra-thin films (less than 1.5 microns). The improvement for thick films (greater than 6 microns) is negligible. For thin film PET and PP, the acrylate coating improves energy density by about 20%. The mechanism for these improvements is unclear. One hypothesis is that the acrylate provides extra oxygen on the polymer dielectric for more efficient burning and attendant improved clearing. But PP has no oxygen in its structure, and yet exhibits the best clearing of all capacitor film material presently available, even without the acrylate coating. Another hypothesis is that the presence of acrylate coating allows film processing into capacitors with less damage because of hardness of the coating, which prevents pinholes and other mechanical degradation. Another hypothesis is that the acrylate has a slightly higher dielectric constant than PP or PET, and that dominates the energy term in the capacitor.

It has been generalized in the film capacitor industry that polymer film material with oxygen in its structure clears better than those without oxygen. In poorer clearing materials, such as those with oxygen deficiency, carbon accumulates at the clearing site, resulting in catastrophic failure from conductive shorts. This may be true to some extent, but the applicant herein submits that other contributing phenomena may determine whether or not a material clears well. This is based on a number of other observations, e.g., polyester has plentiful oxygen in its structure but does not clear as well as polypropylene which has no oxygen in its molecular structure; polyester is relatively polar while polypropylene is non-polar; and polar molecules are more leaky than non-polar molecules. It has also been observed that major failures occur at higher voltages than at lower voltages.

Clearing occurs at a point in the polymer film where the weak spot reaches a limiting voltage lower than the intrinsic voltage breakdown of the polymer. Since electrical stresses are involved in this phenomena, it is reasonable to assume that orientation changes occurring within the polymer as a result of the applied stress are also major contributing factors in the breakdown. The applicant herein is of the opinion that an important factor that may contribute to the poor clearing ability of dielectric polymer films is the orientation phenomenon that occur as a result of the electrical stress.

Polyester, despite having considerable oxygen in its molecular structure undergoes some finite levels of polarization and when clearing occurs, the molecular orientation phenomenon results in a finite clearing residence time. The higher the voltage level, the greater the orientation of the molecules and the greater the residence time during clearing of any weak locations. This allows more carbon residues to accumulate at the weak location in the case of higher voltage levels; hence, resulting in a major failure. With PVDF, the molecule is highly polar, causing increased orientation even at lower voltage levels. It is because of this phenomenon that PVDF is electrically more active than the other polymers and this is reflected in its poor DF and breakdown properties. Likewise, polyester is also somewhat polar and has correspondingly lower DF. However, with polypropylene, the fact that no polarization occurs suggests that this molecule clears instantly the moment breakdown voltage of the weak spot is reached. Since the residence time for clearing is anticipated to be very short, relatively little carbon accumulation is expected, and hence major failure as a result of this phenomenon is minimized. The polypropylene molecule has the best breakdown voltage, best clearing ability and lowest DF of any of the film dielectrics.

Yet another application for improved film capacitors is for surface mount chip capacitors. This has led to the emergence of several higher temperature polymers such as PPS, PPO, PEN and PEEK. These materials are slow in penetrating the capacitor film market because other key properties such as clearability and insulation resistance are often inferior to the lower temperature films. The need for even higher operating temperature has fueled development efforts to produce films that will withstand temperatures greater than 260° C.

It is a principal objective of the present invention to overcome many of the problems of traditional film capacitors and aluminum electrolytic capacitors, and to offer an alternative power source with significantly improved performance capabilities over these prior art devices.

SUMMARY OF THE INVENTION

The primary object of the present invention to provide a polymer film material with the following properties, vis-a-vis, improved dielectric constant, improved breakdown voltage, improved dissipation factor, improved clearability, lower leakage (and hence higher insulation resistance), and higher operating temperature capabilities, and which can be wound in a capacitor to yield an energy density exceeding 5 Joules per cubic centimeter (J/cc). This is achieved by providing a hybrid polymer film material which is a unique copolymer solid-solution blend of a higher dielectric constant material, or a higher temperature resistant material and at least one non-polar dielectric material component. The invention is not limited to two types of dielectric blends but can be extended to three or more resin blends to tailor the appropriate properties.

In a novel capacitor design of the applicant herein described in U.S. patent application Ser. No. 09/065,131, the film capacitor utilizes a wound bi-layer of PVDF and PP (i.e., four film layers in total are wound together in that instance, instead of the traditional method of winding two single layers of similar polymer films with a metallization layer between the two dielectrics) that combines the excellent insulator properties of PP with the excellent dielectric constant of PVDF, to obtain a performance improvement of more than 50% over a single PVDF layer. The improvement is enhanced by increasing the breakdown strength of PVDF/PP combined material when compared to PVDF alone. Nevertheless, variations in thickness and film quality of the bi-layers, intrusion of air between the bi-layers during winding (e for air is 1, with breakdown voltage of only 3 volts per micron compared to several hundred volts per micron for either PVDF or PP and significantly higher dielectric constant), differing thermal electrical properties of the PP and PVDF films in the bi-layers, physical adhesion compatibility issues of the bi-layers, as well as the instability of PVDF homopolymer film, and lack of optimum insulation properties, may combine to limit the long-term reliability of the prior design. By winding four layers together, a greater probability exists of introducing poor uneven windings as a result of the variation in the film thickness. In addition, the prior design does not alter the chemical or electrical properties of the homopolymers, i.e., PVDF is still PVDF, with poor individual electrical properties, and PP is still PP, with poor dielectric constant. In addition, the polar form of PVDF still remains as long as it is in a homopolymer form and just a physical lamination of PVDF and PP.

The present invention overcomes many of the problems of the prior art, and of the aforementioned prior design, through the use of two single layers of new designs of hybrid copolymer film materials in the construction of metallized film capacitors similar to the construction of traditional film capacitors. The invention reduces the introduction of air intrusion during capacitor construction, as observed in the construction of four film layers, since only two film layers are used—hence, increasing the probability of obtaining high performance of the improved film material rather than manufacturing flaws. It also provides a more precise method of tailoring polymer blends with specific film properties for specific applications that cannot be achieved from homopolymer film whether the latter are single layer or combined as bi-layer, tri-layer, etc., films. Since the new material is a copolymer solid solution as opposed to a homopolymer bi-layer, the two copolymer layers used in capacitor fabrication do not present the same thermal/electrical issues as are described above for PVDF/PP bi-layer winding.

A number of new designs of film material are possible with this invention simply by choosing the appropriate initial materials and tailoring the blends for the intended application. For example, in the design and construction of a capacitor for an implantable defibrillator that would require about 5 or more Joules per cc, the selection of a material with a very high dielectric constant, good clearing ability and breakdown voltages would be necessary and desirable. A representative example of two polymers that could be blended into a copolymer to meet these needs is PVDF and PP, but the composition chosen and the specific percentages of the components will depend on the specific requirements of the film capacitor in each particular instance. In this example, by blending the two resins and manufacturing thin films of the copolymer, a material can be obtained in which the highly polar activity of PVDF is reduced and stabilized through the formation of the copolymer. The reduction in the polarization activity is further reflected in the improvements in the electrical properties of the film, including an increase in the breakdown voltage and insulation resistance of the copolymer compared to PVDF alone, and the ability to be manufactured in thin film with increased physical strength through the reduction in the crystallinity of the copolymer. The result is a material with enhanced energy density and electrical stability over PVDF homopolymer alone.

Such design principles are readily extended to other polymeric insulators such as polyester, or polycarbonate or any other dielectrics to tailor special properties desired for a particular application. Very thin metallized film capacitors designed in accordance with this hybrid copolymer technique—which is not limited to a blend of only two polymers but may extend to three or more—enable achieving a device with stable dielectric constant and, hence, stable capacitance with voltage, improved insulation resistance and clearing or self-healing ability, lower leakage currents, and higher voltage breakdowns (compared, for example, with homopolymer PVDF), with the potential for unprecedented energy density from a bulk capacitor system. The markedly higher performance values (energy density, reliability, weight) is anticipated to be matched by markedly lower cost per unit of performance when volume manufacturing is employed. The methodology of the invention is well suited for the production of the implantable defibrillator, for example, and in many other high pulse power applications where energy density is afforded a premium.

Another example of the use of these techniques to achieve new designs is in the development of capacitors for high temperature applications. For example, as indicated in Table 1 above, PPS and PTFE have operating temperature ranges up to about 200° C. Although PTFE can be used at slightly higher temperature, at higher temperatures the electrical properties of the dielectric become very poor. By combining blends of PVDF and PP to either PPS or PTFE in different proportions, the energy density of the capacitor can be increased, and the breakdown strength and other electrical properties can be stabilized for use of the material at temperatures in excess of the indicated range of the homopolymer. This can also be applied to moderate temperature range polymer films such as PET, PEN or PC, to enhance the electrical properties simply by stabilizing with one or more hybrid copolymer components consisting of at least one non-polar group.

According to one preferred embodiment and method of the present invention, homopolymers of high purity (i.e., greater than 99%, preferably greater than 99.9%, pure) PVDF and PP resins are blended and co-extruded (e.g., by twin screw blending) with homogenization to form a melt-cast hybrid copolymer dielectric film. The process results in a thick film, e.g., having a thickness at the lower (thinner) end of a range from about 100 to 200 microns (micrometers, $\mu$m), which requires stretching to make it thinner. The concentration of PVDF in the polymeric hybrid is 1 hundredth to 99 hundredths parts of PVDF, with the balance PP (i.e., 99 hundredths to 1 hundredth part PP).

It will be understood, however, that a specific constituent or concentration of either (or any) constituent in a polymeric blend according to the invention is adjusted so as to tailor the properties of polymeric dielectrics for different applications. For an implantable defibrillator, for example, high energy density is required as well as good DF and breakdown voltages. In that instance (returning to the discussion of the exemplary preferred embodiment commenced above), it is necessary to maximize the PVDF content for the energy requirement and to balance it accordingly with PP to stabilize the poor electrical properties of PVDF. However, to obtain some desired property(ies) other than simply energy density, it may be necessary to reduce the concentration of PVDF to as low as 1 part PVDF to 99 parts PP. It is anticipated that an optimum composition for high performance is in the ratio of at least 1:1, but it is not intended that the specific ratio or concentration of the various component resins in the blend shall constitute a limitation on the breadth or scope of the invention.

For purposes of thinning, the melt-cast film is then bi-axially oriented via machine direction orientation (MDO)

and transverse direction orientation (TDO) stretching, to a final thickness in a range from about 0.5 μm to 25 μm. Such processing is, in and of itself, completely conventional in the art of polymer film extrusion for capacitor manufacture or food packaging (e.g., in the latter case, production of Saran Wrap®, the common household plastic film used to cover food materials). The base hybrid film is then coated to thickness in a range from 0.1 μm to 2.0 μm, for example, with a polymeric material, such as an acrylate, in which the coating may be applied by doctor blading an acrylate solution or by atomization spray, followed in either case by radiation curing. The coating should have properties of good dielectric constant (e.g., 2.5 to 16) and excellent stability (i.e., improved DF and breakdown voltage, etc., relative to PVDF), and is effective to seal any defects including pinholes as well as to harden the surface of the film to some degree. The coated hybrid film is then metallized with a layer of an appropriate metal, such as aluminum, to a thickness typically in a range from 50 Å to 500 Å (Angstroms) by a conventional metallization technique, to provide one electrode or plate of a capacitor, with resistance ranging from 0.1 ohm per square (Ω/sq) to 1000 Ω/sq. Finally, the film is tightly wound with another correspondingly formed coated hybrid metallized film to the required capacitance, and in some cases impregnated with high dielectric constant fluid, and hermetically sealed.

It will be seen, then, that the present invention represents a distinct improvement over the invention disclosed in the aforementioned '131 application wherein homopolymers of PVDF/PP (4 layers) are employed, in contrast to use, according to the present invention, of copolymer blends, which may include coating by acrylate. Two single metallized layers of copolymer provides a much more simple implementation of a capacitor than using multiple bi-, tri-, or greater numbers of layers of many films.

The hybrid copolymer film material of the invention offers high dielectric constant, improved stability, improved dissipation factor, improved clearing ability, and high breakdown voltage. Although this film is particularly well suited for film capacitor applications, it is also useful in electrical cables, magnetic tapes, optical films for security and other purposes, piezoelectric sensors, and food packaging, to name a few other applications.

Therefore, another principal aim of the present invention is to provide an improvement over the invention of the aforementioned '131 application by means of a copolymer solid-solution blend of PVDF and PP to form a hybrid copolymer material which chemically stabilizes the high activity of PVDF and provides improved electrical properties over PVDF alone, in a material with enhanced energy density and electrical stability.

Although a two-polymer blend represents a preferred embodiment, with at least one non-polar component in the blend, the present invention is readily extended to a three or more polymer blend which tailors the specific properties desired for the final polymer. The preceding brief description of copolymer blends comprising PVDF and PP is provided merely for the sake of simplicity and clarity of exemplary embodiments of the invention for high energy density capacitors for use in implantable defibrillator and other high pulse power applications. It will be understood by those skilled in the art that other polymer hybrid blends may be fabricated from a combination of two or more of PVDF, PP, PEN, PPS, PC, PET, PTFE, or other polymeric materials possessing high insulation resistance such as those based on acrylates or polyethylene oxide (PEO) or polypropylene oxide (PPO), for these and other applications. For example, design and fabrication of a hybrid copolymer blend film material for improved or higher temperature applications and with improved electrical properties, may be achieved using a tertiary copolymer blend of PPS, PVDF and PP.

The hybrid copolymer of the invention enables the design of very thin metallized film capacitors with stable dielectric constant and stable capacitance with voltage, as well as improved insulation resistance and clearing or self-healing ability, lower leakage currents and higher voltage breakdown compared, for example, with homopolymer PVDF, with the potential for energy density greater than 8 J/cc from a bulk capacitor system. This represents a more than threefold increase over state of the art PVDF film capacitors, and a more than six-fold increase over other polymer films, in energy density. Further, the cost of the hybrid capacitor of the present invention could be about 50% lower than existing film capacitors on a per unit energy basis, with the economies of scale of volume manufacturing.

At about 600 volts per micron and a dielectric constant of about 12, the intrinsic energy density of PVDF is about 19 J/cc, and the intrinsic energy density of PP is about 3.5 J/cc. In practice, PP capacitors have achieved 1 to 1.5 J/cc, representing about 30% to 40% of their intrinsic value; whereas PVDF capacitors have attained only about 12% of their intrinsic value. The poor dielectric properties of PVDF (except for dielectric constant) appear to be responsible for its low practical yields. Use of acrylate coating or lighter metallization may improve PP's properties, but not necessarily lead to higher levels of energy density. Further, such modifications for PVDF may only lead to about a 20% increase in its energy density through improved breakdown, with no effect on its other poor properties such as high DF and poor insulation resistance, reliability and mechanical properties, among others, and may still not render the material suitable for applications requiring high repetition rates.

By combining the desirable properties of these two materials in a copolymer design, a hybrid polymeric dielectric is achieved with considerable beneficial results. Their relatively close melting points—PVDF at 171° C., and PP at 189° C.—ensures good melt blending of the two polymers, and similar rates of cooling without polymer segregation. The applicant herein is not aware of any other film dielectric material that would serve to enhance energy density by a two- to three-fold increase over state of the art PVDF film capacitors.

A further aim of the invention is to enhance the properties of the hybrid film by coating it with a material, such as acrylate, that has a good dielectric constant and high stability. This improves the base film by sealing defects and pinholes, and further, by hardening the surface to some degree. Other materials that would serve as such a coating include, without limitation, PEO, PET, PPS, PC, PTFE and PEN film.

Still another objective of the invention is to improve the voltage breakdown and clearing ability of the hybrid film by use of lighter metallization processes.

A further objective is to enhance the performance of the hybrid film capacitor material, especially for high energy and high pulse power applications, by impregnating the wound film materials with a high dielectric fluid in a hermetic design. Aromatic compounds such as butyl phenyl sulfone, isopropyl phenyl sulfone, and others, have very high dielectric constants—exceeding 30—and wetting abilities, better than standard castor oil and trecresyl phosphate, for use in high energy and high power applications. Representative materials are described, for example, in U.S. Pat. No. 4,912,596 to Kron.

Yet another objective of the present invention is to provide such hybrid film materials constituting blends of PVDF, PP, PEN, PET, PPS, PTFE, PC, for example, and various copolymers of such materials, by manufacturing methods such as bi-axial extrusion, or blown bubble process, or melt cast or solvent casting techniques, or vapor deposition onto a substrate.

Still another aim of the invention is to provide a thin coat of a material of high dielectric constant and relatively low electrical properties, such as PVDF, onto a capacitor grade polymer film of lower dielectric constant but higher electrical properties, such as PP, PET, PEN, PPS, PC or PTFE, or copolymers or hybrid polymers formed from such blends. The coating material thickness ranges from 0.1 micron to 25 microns, and the coated substrate thickness ranges from 0.5 micron to 25 microns. The coating can be solvent cast directly onto the polymer substrate, or vapor deposited in an atomized manner, or melt cast directly onto another melt cast substrate, or heat laminated. The coating can be applied to either MDO or TDO substrate polymer film. If an MDO substrate is used, the coated film could be stretched subsequently in the TDO direction, to achieve bi-axial direction orientation for the coating.

BRIEF DESCRIPTION OF THE INVENTION

The above and still further aims, objectives, features, aspects and attendant advantages of the present invention will become apparent from the following detailed description of a preferred embodiment and method of fabrication of a film capacitor in accordance with the invention, constituting the best mode presently contemplated of practicing the invention, when taken in conjunction with the accompanying drawings, in which:

FIGS. 2A and 2B are, respectively, a longitudinal sectional view and a cross-sectional view.

DETAILED DESCRIPTION OF PREFERRED EMBODIMENT AND METHOD

Figure 1:
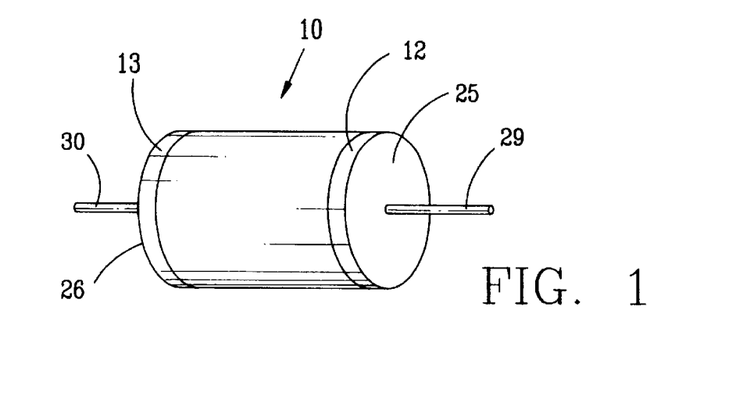
FIG. 1 is a perspective view of a presently preferred embodiment of a wound metallized film capacitor according to the present invention.
Figure 2A:
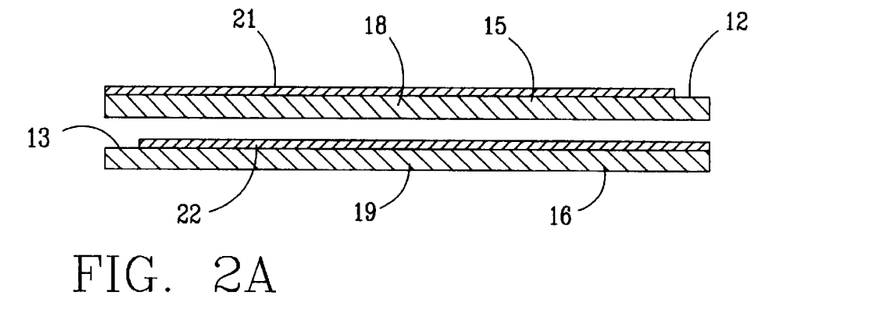

A typical preparation of a hybrid copolymer film according to one embodiment of the invention for use in a capacitor will be described with reference to the flow chart of FIG. 3, commencing with the mixing of at least one homopolymer component from a non-polar group, which serves to stabilize the film, and one or more homopolymer components from polar or non-polar groups. For application as a high energy film capacitor 10 (FIGS. 1 and 2C) for an implantable defibrillator, for example, homopolymer components PP and PVDF are especially suitable. A co-extrusion (twin screw) of homopolymer high purity PVDF (Solvay) and PP (Exxon) resins fed separately into the extruder via hoppers, blends the resins with homogenization to form a resin melt-cast dielectric film. An extruded method is preferred over the so-called "blown bubble" method because closer thickness tolerances can be achieved. Operating conditions of the extrusion process, including temperature, throughput, die opening and width, etc., may be adjusted until a good quality melt-cast film is obtained. The operating conditions will vary for each composition even if the resin materials are the same. For multi-resin extrusion, the resin pellets are mixed according to the type of extrusion system available. For example, for a tertiary component system, resin copolymers of PVDF and PP could be formed as one component and either PPS or PC or PET or PEN could be used as the second component in a twin screw extruder. Alternatively, the entire resin pellets of the mixture could be melted before extrusion into a melt-cast.

Even though PVDF melts at 171° C. and PP melts at 189° C., the resin melt is usually at significantly higher temperatures, typically at about 250° C. to 300° C. The resin melt is injected onto a chilling- wheel to cool the resin and form a solid film. Because of the higher temperature of the resin melt, adequate heat exists within the polymer during injection of the melt to allow stretching to a thinner sheet before ultimately being stretched further and pulled wider to a still thinner sheet during machine direction orientation (MDO, i.e., in the direction of the film travel).

The extrusion temperature and the throughput of the individual resin will vary depending upon the formulation composition, and the throughput die opening and width will depend upon the desired thickness and width of the final film. Typically, these parameters are varied to achieve a melt-cast resin thickness in range from about 100 to 200 microns, with preference for the thinner end of this range, so as to achieve a final film thickness of about 4 microns at the end of the processing run, and a width in a range from about 20 to 30 inches. Hence, if a final film thickness of about 2 microns is desired, the starting melt-cast thickness should be in a range from about 50 to 100 microns. The wide range of variation present in these numbers is because each polymer will stretch and thin differently, and processing at various stages must be adjusted to obtain the most optimum film desired without breaking, wrinkling, or overheating of the film web, for manufacture at the desired rate. Typically, achievement of a good quality film means that the film is clean of dust or specks; has no bubbles, pinholes or other visible inclusions or impurities within the film; is static-free (to preclude attracting dust particles); and is wrinkle-free, to mention its principal attributes.

The melt-cast film is then bi-axially oriented, first being pulled along and through several rollers for feeding it under proper tension into the MDO heated chamber where it is stretched so as to exit the chamber with a typical film thickness in a range from about 25 to 50 microns. The MDO chamber has a series of rollers and tension control system that stretches the film in the direction of film travel to produce a thinner film with a more uniform thickness. The film exits the MDO chamber at a speed which is faster than that at entry, depending upon the film thickness at the end of the MDO run. For example, a melt-cast film thickness of 100 microns at entry into the MDO chamber, which is stretched therein to a film thickness of 25 microns, will exit the MDO chamber at four times its entry speed. Here again, the process parameters in the MDO chamber are adjusted—to control conditions such as line speed, film tension, stretching ratios, and so forth, for optimum film quality and desired final thickness. These conditions are dependent not simply on the final film thickness, but primarily on the properties of the resin. The parameters chosen in the first stage of the film processing, i.e., extrusion and melt-cast film production, will affect the parameters chosen in the second stage of the film processing, i.e., the MDO stretching.

Figure 3:
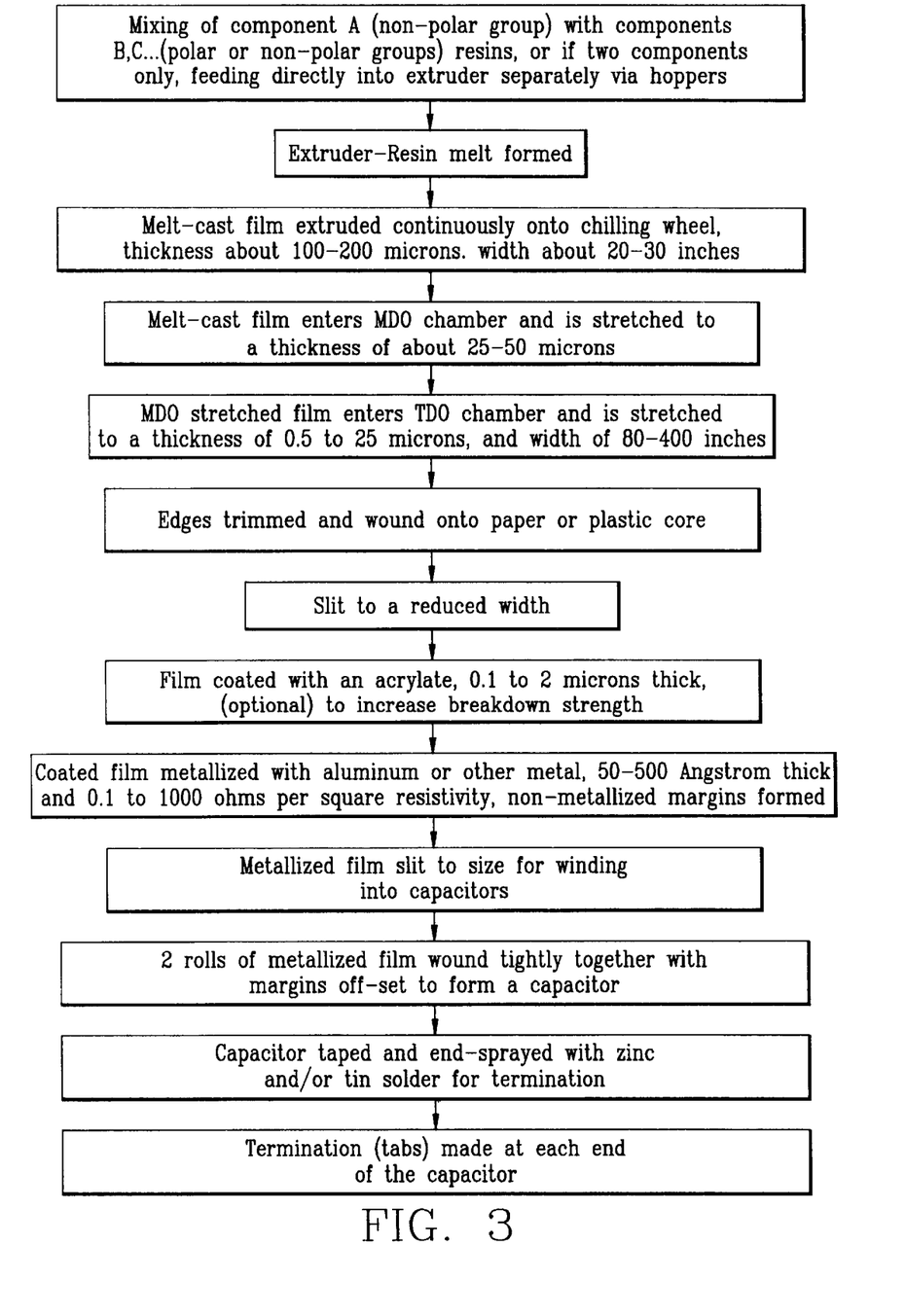
FIG. 3 is a flow chart of a presently preferred method of manufacturing the capacitor embodiment of FIG. 1.

With continuing reference to the flow chart of FIG. 3, the thinner film exiting the MDO chamber is fed through additional rollers to maintain proper tension, and then enters the transverse direction orientation (TDO) chamber where it is stretched in the transverse direction by the tenter method. This is a conventional technique in which the film is seized by a continuous series of mechanical jaws at both ends of the film width just before the film enters the TDO chamber. As in the case of the MDO chamber, the TDO chamber is heated. This chamber typically has a length in a range from about 40 to 100 feet, depending upon the extent of film production. Width of films being processed through the chamber may vary from two meters to several meters.

As the film moves forward in the TDO chamber, the mechanical jaws move outward and thereby stretch the film to make it thinner and wider, typically to a final thickness in a range from about 0.5 to 25 microns and a width in a range from about 80 to 400 inches. At the opposite (i.e., exit) end of the TDO chamber, the jaws are automatically actuated to release the further thinned and widened film for winding onto paper or plastic cores. As a result of the stretching, the speed of the film at exit from the TDO chamber is considerably faster than the film speed at entry. For example, a film with 100 micron melt-cast thickness exiting the MDO chamber at 25 microns thick travels at four times the speed at entry, as noted above, and if it has then been stretched to a final thickness of 2.5 microns, will exit from the TDO chamber with a speed which is 40 times the speed of the original melt-cast film.

Here also, the processing parameters of the TDO chamber will depend upon desired film thickness as well on production feasibility. Film speed and stretching ratio in the transverse direction in the TDO chamber will determine the final film thickness. The dwell time selected for the film in the TDO is also important, as it controls the reduction in film thickness without breakage. Before winding onto paper or plastic cores, the film is trimmed at its edges with blades placed at either end of the film web to avoid film puckering that would otherwise cause wrinkles and other abnormalities in the film, with undesirable effect on capacitor performance. Typically, the place(s) where the jaws seize the film are thicker than the bulk film.

Once the film has been manufactured and wound onto cores, it can be slit into any size desired. Any concentration of PVDF to PP (PVDF:PP) polymeric hybrid copolymers in a range consisting of from 1 to 99 parts of PVDF with the balance PP (i.e., from 99 parts to 1 part of PP) is suitable for purposes of this preferred embodiment and method of the present invention.

The base hybrid copolymer film so produced can then be processed further, if desired, to improve its electrical properties, at the same or another processing facility. For example, the film may be coated with another dielectric polymer to enhance the base film properties and may also be metallized with a thin metal layer. As further indicated in the flow chart of FIG. 3, a coating of a polymeric material such as an acrylate may be applied to the base film in a single but continuous step to a thickness in a range from about 0.1 to 2.0 microns. Such a coating may be applied either through casting an acrylate solution directly onto the film and curing the acrylate using electron beam or ultraviolet radiation, or depositing the acrylate via a spray or atomization method followed by such curing. The latter technique is preferred because it allows better control over the thickness of the acrylate layer.

The coated film may then be metallized, for example by spraying a metal (typically, aluminum) onto the moving polymer film via vapor deposition in a vacuum chamber, to a thickness in a range from about 50 to about 500 Å. The desired resistivity of the metal on the polymer film is typically in a range from about 0.1 ohm per square to 1000 ohms per square. The higher the resistance, the better the breakdown voltage of the film dielectric. Before the metallization process is performed, the polymer film is appropriately masked to provide unmetallized margins at the edges of the width of the film 11 as best shown in the longitudinal sectional view of FIG. 2A, where alternate layers of film 15, 16 (when the capacitor is assembled, as described below) are illustrated as having these unmetallized margins at 12 and 13, respectively, at opposite edges to prevent electrical shorting of the electrodes of the capacitor 10 when the end metallization is ultimately applied, as will be explained presently.

Once the polymer has been metallized, it is slit further to the width equivalent to the metallized layer plus an unmetallized margin. Although it is not absolutely necessary to coat the copolymer film with an acrylate or other polymer in the processing of the film for film capacitor manufacture, it is necessary to metallize the film to manufacture metallized film capacitors. However, the present invention is not restricted to metallized capacitor manufacturing of the novel film dielectric, but, rather, is readily extended to other types of capacitors such as those incorporating discrete foils, and those involving impregnation by a fluid.

Figure 2B:
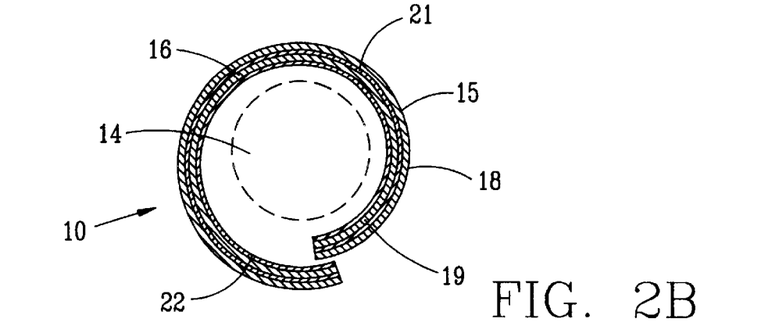
Figure 2C:
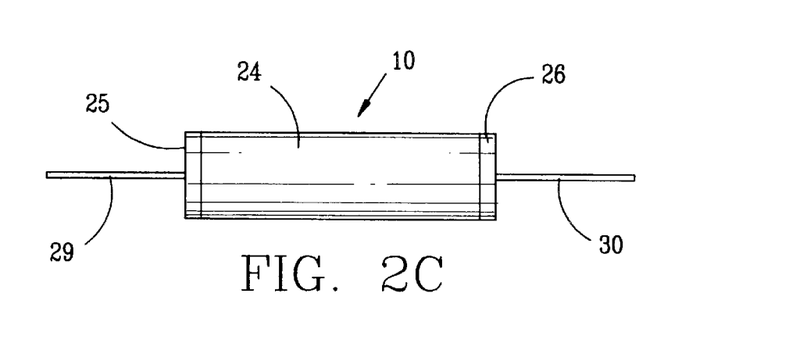
FIG. 2C is a side view, of the film capacitor embodiment of FIG. 1.

Finally, two separate rolls of the metallized film 15, 16 produced by the foregoing exemplary method are placed in a capacitor winder and wound tightly together on a mandrel 14 (which may subsequently be removed) so that the layers are arranged in the sequence dielectric 18/metallized portion 21/dielectric 19/metallized portion 22, as best shown in the cross-sectional view of FIG. 2B. This replicates a typical construction of the capacitor 10, i.e., a dielectric with two metallic plates on opposite sides. The two rolls of film are wound with the margins (12, 13, FIG. 2A) on opposite sides.

The extent of winding of the capacitor depends on the physical size of the capacitor desired or on the capacitance desired. The thickness of the copolymer film determines the voltage limit of the capacitor. Tight winding of the two rolls aids in removing any entrapped air that might otherwise cause premature breakdown. Individual capacitors should be processed in a clean room environment of at least class 100, incorporating HEPA filters, to reduce the likelihood of contamination of the contact point between the dielectric film layers by foreign particles as well as reducing moisture intake in the dielectric.

Electric winding is preferred, because it better serves to maintain uniform tension on each capacitor. The length and thickness of the film wound (as at 24, FIG. 2C) in a capacitor 10 are carefully measured so as to accurately calculate the energy density and other electrical parameters of the device. The capacitor 10 is taped at the edges thereof and strapped in a tray open on both sides, to prevent unwinding of the film layers and to allow the edges or ends of the cylinder to be sprayed with a conductive element (25, 26, FIGS. 1 and 2C). To that end, both ends of the capacitor 10 are schooped or metal sprayed with a high zinc content solder (harder material) followed by a regular softer "Babbit" end spray solder of 90% tin, 10% zinc. The first spray scratches the metallized surface and creates a trough to achieve better contact with the metallization on the dielectric film. The combination of end sprays further aids better contact adhesion with the final termination. Subsequently, aluminum leads 29, 30 (FIG. 2C), are soldered onto each end to form the final termination. One termination is spot welded to the bottom of an aluminum can, while the other termination is parallel welded to the lid. The capacitor is filled with a liquid impregnate (typically, isopropyl phenyl sulfone, not shown) in vacuum filling apparatus, and is then crimp-closed.

Homopolymer film such as PP can be coated with PVDF or other capacitor grade polymer using a melt casting or solvent casting process, or vapor deposited or sprayed using an atomizer. The vapor depositing or spraying system can deposit the polymer coating from a solution, hot-resin or melted resin. The higher temperature ensures a lower viscosity, allowing the atomized particle to be in the nano size range. Each of the coated polymer and the homopolymer comprises a single or a multi-polymer film prepared in the above manner, from PET, PP, PVDF, PPS, PTFE, PEN, PC, PEO, or acrylates. The preferable method is vapor-depositing, with the base film wound from one roll to another; and the second polymer is vapor deposited by atomizing either from a solvent-polymer system or a melt-polymer system. The method is readily extended to a second or a third coating to increase the thickness of the coating, or to laminate a second and subsequent layer of a polymer or polymers, which has a different composition from that of the first layer. The method may further be extended to include polymers which are radiation curable, using either ultraviolet or electron beam radiation. Typical radiation curable polymers include acrylates which are available from various manufacturers, including Radcure, in a wide range of different grades and compositions.

The excellent properties of this hybrid polymer may extend to applications for electric vehicles, as well as to compact energy storage applications such as lasers, and other pulsed power applications. Although the piezoelectric properties of PVDF have long been known, wide scale commercial use of this material has been limited by an unavailability of consistently stable high-activity materials. The PVDF-PP hybrid developed in accordance with the preferred method and embodiment of the invention provides improved stability, consistency and high levels of piezoelectric activity, and is anticipated to be useful in loudspeakers, touch sensors, ultrasonic ranging and imaging devices, and automobile bumper sensors, to name a few applications.

Although certain preferred embodiments and methods have been disclosed herein, it will be appreciated by those skilled in the art to which the invention pertains, from a consideration of the foregoing description, that variations and modifications may be made without departing from the spirit and scope of the invention. Accordingly, it is intended that the invention shall be limited only by the appended claims and the rules and principles of applicable law.

What is claimed is:

1. A dielectric film with values of at least some electrical properties thereof among dielectric constant, dielectric strength, stability, breakdown voltage, dissipation factor, clearability, and insulation resistance optimized for usage of said dielectric film in a film capacitor, said dielectric film comprising a melt-cast substantially homogeneous hybrid copolymer solid-solution blend of at least one non-polar homopolymer and at least one other homopolymer, in which the specific designation and concentration of each of said homopolymers in said blend are selected for tailoring said properties of the dielectric film to achieve said optimization.

2. The dielectric film of claim 1, wherein said melt-cast hybrid copolymer solid-solution blend comprises a third homopolymer selected to further tailor said properties of the dielectric film.

3. The dielectric film of claim 2, wherein each of said homopolymers introduced in the melt-cast hybrid coplymer solid-solution blend comprises a resin.

4. The dielectric film of claim 1, wherein said homopolymers are selected from a group consisting of polyvinylidenefluoride (PVDF), polypropylene (PP), polyester (PET), polyethylene-napthlate (PEN), polyphenylenesulfide (PPS), polycarbonate (PC), polytetrafluoroethylene (PTFE), polyethylene oxide (PEO) and polypropylene oxide (PPO), or copolymers of said homopolymers.

5. The dielectric film of claim 1, wherein said at least one other homopolymer is polar.

6. The dielectric film of claim 1, wherein said at least one other homopolymer is non-polar.

7. A dielectric film with values of at least some properties thereof among dielectric constant, dielectric strength, stability, breakdown voltage, dissipation factor, clearability, insulation resistance, and operating temperature optimized for usage of said dielectric film in a film capacitor, said dielectric film comprising a melt-cast hybrid copolymer solid-solution blend of at least one non-polar homopolymer and at least one other homopolymer, wherein said homopolymers include at least polypropylene (PP) and polyvinylidenefluoride (PVDF) in a concentration range from 0.99 to 0.01 PVDF, with the balance PP, in which the specific designation and concentration of each of said homopolymers in said blend are selected for tailoring said properties of the dielectric film to achieve said optimization.

8. A dielectric film for a dry film capacitor, comprising a melt-cast hybrid copolymer solid-solution blend of at least one homopolymer selected to have non-polar characteristics to stabilize said film, and at least one polar homopolymer, each of said homopolymers having at least one predetermined property for which its presence and its concentration in the blend are selected to offset a weak property of the other homopolymer and thereby tailor a selected property of said dielectric film toward a desired value from among properties of dielectric constant, dielectric strength, stability, breakdown voltage, dissipation factor, clearability, insulation resistance, and operating temperature.

9. The dielectric film of claim 8, wherein said blend includes a third homopolymer selected to tailor a further property of the dielectric film among said properties toward a desired value.

10. A dielectric film comprising a melt-cast hybrid copolymer solid-solution blend of at least one non-polar homopolymer selected to stabilize said film, and at least one other homopolymer having a predetermined property selected to enhance the same property of said dielectric film from among properties of dielectric constant, dielectric strength, stability, breakdown voltage, dissipation factor, clearability, insulation resistance, and operating temperature, wherein said homopolymers are polypropylene (PP) and polyvinylidenefluoride (PVDF) in a concentration ratio of from 99% to 1% PVDF to from 1% to 99% PP by weight, respectively.

11. A dry film capacitor comprising:
  a melt-cast hybrid copolymeric dielectric film composed of a homogeneous solid-solution blend of at least one homopolymer selected to have non-polar characteristics to stabilize said film, with at least one polar homopolymer, each of said homopolymers having properties and concentrations in said blend selected to tailor at least one predetermined property of said dielectric film toward a desired value from among properties including dielectric constant, dielectric strength, stability, breakdown voltage, dissipation factor, clearability, insulation resistance, and operating temperature, and
  a pair of spaced-apart metal films between which said dielectric film is tightly sandwiched.

12. The film capacitor of claim 11, wherein said dielectric film is tightly wound between said spaced-apart metal films.

13. The film capacitor of claim 11, wherein said blend includes a third polymer having properties and a concentration in said blend selected to tailor another predetermined property of said dielectric film toward a desired value.

14. The film capacitor of claim 11, wherein said homopolymers are selected from a group consisting of polyvinylidenefluoride (PVDF), polypropylene (PP), polyester (PET), polyethylene-napthlate (PEN), polyphenylene-sulfide (PPS), polycarbonate (PC), polytetrafluoroethylene (PTFE), polyethylene oxide (PEO), and polypropylene oxide (PPO), or copolymers of said homopolymers.

15. The film capacitor of claim 11, wherein said at least one other homopolymer is polar.

16. The film capacitor of claim 11, wherein said at least one other homopolymer is non-polar.

17. A film capacitor comprising:
a melt-cast hybrid copolymeric dielectric film composed of a homogeneous solid-solution blend of at least one non-polar homopolymer with at least one other homopolymer, said homopolymers having properties and concentrations in said blend selected to tailor at least one predetermined property of said dielectric film from among properties including dielectric constant, dielectric strength, stability, breakdown voltage, dissipation factor, clearability, insulation resistance, and operating temperature, wherein said homopolymers are polypropylene (PP) and polyvinylidenefluoride (PVDF) in volume concentrations of from 99% to 1% PVDF, and the balance PP, and
a pair of spaced-apart metal films between which said dielectric film is tightly sandwiched, wherein said film capacitor has an energy density exceeding 5 Joules per cubic centimeter.

18. An improved polymeric film of high dielectric constant and dielectric strength, high stability and low dissipation factor, comprising:
a hybrid solid-solution blend of homopolymers of high purity polyvinylidenefluoride (PVDF) and polypropylene (PP) resins in a concentration ratio of PVDF:PP ranging from 1% to 99 % PVDF and the balance PP, said concentration ratio being selected to tailor properties of said film including dielectric constant, dielectric strength, stability and dissipation factor,
said film being bi-axially oriented with a thickness in a range from about 0.5 $\mu$m to 25 $\mu$m, and having a polymeric coating with properties of dielectric constant and stability selected to seal defects and provide limited hardening of the surface of said film.

19. A metallized film capacitor having an energy density exceeding 5 Joules per cubic centimeter, comprising:
a dielectric film composed of a melt-cast hybrid copolymer solid-solution blend of homopolymers of high purity polyvinylidenefluoride (PVDF) and polypropylene (PP) resins in concentrations ranging from 1% to 99% PVDF and the balance PP selected to tailor at least one of the properties of said dielectric film including dielectric constant, dielectric strength, stability, breakdown voltage, dissipation factor, clearability, insulation resistance, and operating temperature, said dielectric film having bi-axial orientation and a thickness in a range from about 0.5 $\mu$m to 25 $\mu$m,
a polymeric coating on said dielectric film having properties of dielectric constant and stability selected to seal defects and provide limited hardening of the surface of said dielectric film,
one major surface of the coated dielectric film being metallized, the metallized coated film being wound with an unmetallized major surface thereof opposite said one major surface in tight contact with a metallized major surface of a corresponding metallized coated dielectric film to form said capacitor with a predetermined capacitance value.

20. The metallized film capacitor of claim 19, wherein said wound metallized coated dielectric films are impregnated with high dielectric constant fluid and hermetically sealed.

21. Method of manufacturing a metallized film capacitor, comprising the steps of:
selecting at least two homopolymers of high purity, capacitor grade polymeric resins according to desired properties of a dielectric film for said metallized film capacitor including dielectric constant, dielectric strength, stability, breakdown voltage, dissipation factor, clearability, insulation resistance, and operating temperature;
forming a melt-cast hybrid copolymer homogeneous blend of said at least two homopolymers into a thin dielectric film;
bi-axially orienting said thin dielectric film by stretching thereof with a machine direction orientation to a thickness in a range from about 25 to about 50 microns and thereafter stretching said film in a transverse direction orientation to a thickness in a range from about 0.5 to about 25 microns;
coating said biaxially oriented dielectric film with a polymeric material selected to seal defects in and to at least slightly harden the surface of said film;
applying an adherent layer of metal having an electrical resistance in a range from about 0.1 ohm to about 1000 ohms per square onto one major surface of the coated dielectric film; and
tightly winding the metallized coated dielectric film with another correspondingly formed metallized coated dielectric film with an unmetallized major surface of one abutting a metallized major surface of the other, to provide said metallized film capacitor with a desired capacitance value.

22. The method of claim 21, wherein said at least two homopolymers are polyvinylidenefluoride (PVDF) and polypropylene (PP).

23. The method of claim 22, wherein the polymeric material used in the coating step is an acrylate.

24. The method of claim 23, wherein the metal applied to the coated dielectric film is aluminum.

25. The method of claim 21, including the steps of impregnating the wound films with high dielectric constant fluid, and hermetically sealing the capacitor.

26. The method of claim 21, wherein one of said at least two homopolymers is selected from a non-polar group, for stabilizing said dielectric film.

27. Method of manufacturing a dielectric film, comprising the steps of:
homogeneously blending into a solid-solution blend at least two homopolymers of high purity polymeric resins with properties and in concentrations preselected to tailor said dielectric film toward desired values of properties from among dielectric constant, dielectric strength, stability, breakdown voltage, dissipation factor, clearability, insulation resistance, and operating temperature of the film;
forming a melt-cast hybrid copolymer dielectric film from the homogeneously blended homopolymers; and bi-axially orienting said melt-cast hybrid copolymer dielectric film by stretching it in a machine direction orientation and a transverse direction orientation, to achieve a desired final film thickness.

28. The method of claim 27, wherein one of said at least two homopolymers is non-polar, for stabilizing said dielectric film.

29. The method of claim 27, including homogeneously blending a third homopolymer resin preselected to tailor at least one of said predetermined properties of the dielectric film, into said solid-solution blend.

30. The method of claim 27, including continuing the stretching until said bi-axially oriented dielectric film reaches a final thickness in a range from about 0.5 to about 25 microns.

31. Method of manufacturing a dielectric film, comprising the steps of:
  homogeneously blending into a solid-solution blend at least two homopolymers of high purity polymeric resins with properties and in concentrations preselected to provide said dielectric film with desired properties from among dielectric constant, dielectric strength, stability, breakdown voltage, dissipation factor, clearability, insulation resistance, and operating temperature of the film, wherein said at least two homopolymers are polyvinylidenefluoride (PVDF) and polypropylene (PP);
  forming a melt-cast hybrid copolymer dielectric film from the homogeneously blended homopolymers; and
  bi-axially orienting said melt-cast hybrid copolymer dielectric film by stretching it in a machine direction orientation and a transverse direction orientation, to achieve a desired final film thickness.

32. Method of manufacturing a dielectric film, comprising the steps of:
  homogeneously blending into a solid-solution blend at least two homopolymers of high purity polymeric resins with properties and in concentrations preselected to provide said dielectric film with desired properties from among dielectric constant, dielectric strength, stability, breakdown voltage, dissipation factor, clearability, insulation resistance, and operating temperature of the film;
  forming a melt-cast hybrid copolymer dielectric film from the homogeneously blended homopolymers;
  bi-axially orienting said melt-cast hybrid copolymer dielectric film by stretching it in a machine direction orientation and a transverse direction orientation, to achieve a desired final film thickness; and
  coating said bi-axially oriented film with polymeric material selected to seal defects in and to at least slightly harden the surface of said dielectric film.

33. A polymeric film for use as a dielectric in a film capacitor, said polymeric film comprising:
  a hybrid copolymer solid-solution blend, including
    a first component having at least one of electrical properties among dielectric constant, dielectric strength, stability, breakdown voltage, dissipation factor, clearability, and insulation resistance with an intrinsic value that renders said first component highly suitable as a dielectric in the film capacitor, and having at least another of said electrical properties with an intrinsic value that detracts from the suitability of said first component as a dielectric in the film capacitor, and
    a second component having said another electrical property with an intrinsic value that renders said second component highly suitable as a dielectric in the film capacitor,
  the relative proportions of said first and second components of said hybrid copolymer solid-solution blend being selected to produce an optimum value of said another electrical property in the blend for the film capacitor application.

34. The polymeric film of claim 33, wherein said first and second components are selected to optimize energy density of the film capacitor in which said polymeric film is to be used.

35. The polymeric film of claim 33, wherein one of said first and second components has a polar molecular structure and the other of said first and second components has a non-polar molecular structure.

36. The polymeric film of claim 33, wherein at least one of said first and second components has a non-polar molecular structure.

37. The polymeric film of claim 33, wherein each of said first and second components is derived from a monomer, homopolymer or polymer.

38. The polymeric film of claim 33, wherein said first component is polyvinylidenefluoride (PVDF) and said second component is polypropylene (PP).

39. The polymeric film of claim 33, including a third component for optimizing the value of still another property in the blend for the film capacitor application.

40. The polymeric film of claim 39, wherein said still another property is operating temperature range.

41. The polymeric film of claim 39, wherein said third component is selected from the group consisting of polyester (PET), polyethylene-napthlate (PEN), polyphenylenesulfide (PPS), polycarbonate (PC), polytetrafluoroethylene (PTFE), polyethylene oxide (PEO) and polypropylene oxide (PPO), or copolymers thereof.

42. A dielectric film comprising a melt-cast hybrid copolymer solid-solution blend of at least two polymeric constituents, one of said constituents having an electrical property among dielectric constant, dielectric strength, stability, breakdown voltage, dissipation factor, clearability, and insulation resistance, with a value that renders said one constituent desirable for a predetermined capacitor application and having another among said electrical properties with a value that renders said one constituent unsuitable for said predetermined capacitor application; and another of said constituents selected for its value of said another electrical property to enhance said another electrical property of the overall blend for said predetermined capacitor application.

43. The dielectric film of claim 42, wherein said one constituent has a polar molecular structure and said another constituent has a non-polar molecular structure.

44. The dielectric film of claim 42, wherein each of said constituents is derived from a monomer, homopolymer or polymer.

45. A film capacitor comprising:
  a melt-cast hybrid copolymer dielectric film composed of a homogeneous solid-solution blend comprising two polymeric constituents,
    one of said two constituents having an electrical property among dielectric constant, dielectric strength, stability, breakdown voltage, dissipation factor, clearability, and insulation resistance, with a value that renders said one constituent desirable for a predetermined application of said film capacitor and having another among said electrical properties with a value that renders said one constituent unsuitable for said predetermined application, and the other of said two constituents selected for its value of said another electrical property to enhance said another electrical property of the overall blend sufficiently to overcome the unsuitability of said one constituent for said predetermined application; and a pair of spaced-apart metal films between which said dielectric film is tightly sandwiched.

46. The film capacitor of claim 45, wherein said one constituent has a polar molecular structure and said another constituent has a non-polar molecular structure.

47. The film capacitor of claim 45, wherein each of said constituents is derived from a monomer, homopolymer or polymer.

48. Method of manufacturing a polymeric film for a film capacitor, comprising the steps of:

blending at least two polymer resin components to form a hybrid copolymer solid-solution, including selecting one of said components for an electrical property among dielectric constant, dielectric strength, stability, breakdown voltage, dissipation factor, clearability, and insulation resistance with an intrinsic value that renders said one component highly suitable for inclusion in the film capacitor, but having another of said electrical properties with an intrinsic value that detracts from the suitability of said one component for inclusion in the film capacitor, selecting the other of said components for its having said another electrical property of desirable intrinsic value for inclusion in the film capacitor, and setting the relative proportions of said components in said blend to produce an optimum value of said another electrical property in the polymeric film for the film capacitor application.

49. The method of claim 48, including selecting said first and second components to optimize energy density of the film capacitor in which said polymeric film is to be used.

50. The method of claim 48, including selecting one of said first and second components to have a polar molecular structure and selecting the other of said first and second components to have a non-polar molecular structure.

51. The method of claim 48, including selecting at least one of said first and second components to have a non-polar molecular structure.

52. The method of claim 48, including selecting each of said first and second components from a monomer, homopolymer or polymer.

53. The method of claim 48, including selecting polyvinylidenefluoride (PVDF) as said first component and polypropylene (PP) as said second component.

54. The method of claim 48, including blending in a third component for optimizing the value of still another property of said polymeric film for the film capacitor application.

55. The method of claim 54, including selecting operating temperature range as said still another property.

56. The method of claim 54, including selecting said third component from the group consisting of polyester (PET), polyethylene-napthlate (PEN), polyphenylenesulfide (PPS), polycarbonate (PC), polytetrafluoroethylene (PTFE), polyethylene oxide (PEO) and polypropylene oxide (PPO), or copolymers thereof.

* * * * *